US010296730B2

(12) United States Patent
Gillespie et al.

(10) Patent No.: US 10,296,730 B2
(45) Date of Patent: May 21, 2019

(54) SYSTEMS AND METHODS FOR AUTOMATIC GENERATION AND RETRIEVAL OF AN INFORMATION HANDLING SYSTEM PASSWORD

(71) Applicant: Dell Products L.P., Round Rock, TX (US)

(72) Inventors: Kurt D. Gillespie, Pflugerville, TX (US); Ricardo L. Martinez, Leander, TX (US); Janardan Rajagopal Pradeep Gopal, Round Rock, TX (US); Richard Chan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/461,632

(22) Filed: Aug. 18, 2014

(65) Prior Publication Data

US 2016/0048663 A1 Feb. 18, 2016

(51) Int. Cl.
*G06F 21/00* (2013.01)
*G06F 21/31* (2013.01)
*G06F 21/45* (2013.01)
*G06F 21/57* (2013.01)

(52) U.S. Cl.
CPC .............. *G06F 21/31* (2013.01); *G06F 21/45* (2013.01); *G06F 21/575* (2013.01)

(58) Field of Classification Search
CPC .......... G06F 21/31; G06F 21/45; G06F 21/46; G06F 21/82; G06F 21/575
USPC ...................................................... 726/16–18
See application file for complete search history.

(56) References Cited

U.S. PATENT DOCUMENTS

| 6,223,284 | B1 * | 4/2001 | Novoa | G06F 21/572 |
| | | | | 709/216 |
| 8,099,766 | B1 * | 1/2012 | Corbett | H04L 67/1097 |
| | | | | 726/6 |
| 8,321,682 | B1 * | 11/2012 | Read et al. | 713/183 |
| 8,646,054 | B1 * | 2/2014 | Karr | G06F 21/31 |
| | | | | 380/281 |
| 2005/0182945 | A1 * | 8/2005 | Ali | G06F 21/31 |
| | | | | 713/182 |

(Continued)

OTHER PUBLICATIONS

Sun Oracle, "Oracle Integrated Lights Out Manager (ILOM) 3.0-CLI Procedures Guide", Oct. 2010, pp. 25-26.*

*Primary Examiner* — Joseph P Hirl
*Assistant Examiner* — Chi D Nguy
(74) *Attorney, Agent, or Firm* — Jackson Walker L.L.P.

(57) ABSTRACT

In accordance with embodiments of the present disclosure, an information handling system may include a processor and a basic input/output system (BIOS). The BIOS may comprise a program of instructions executable by the processor and configured to cause the processor to initialize one or more information handling resources of the information handling system. The BIOS may further be configured to, during a boot of an information handling system, and in response to a request to set a password associated with the information handling system, generate a random password, securely store the random password in a memory such that the password may be retrieved during a subsequent boot of the information handling system by a user physically present at the information handling system, and set the random password as the password associated with the information handling system.

17 Claims, 2 Drawing Sheets

(56) References Cited

U.S. PATENT DOCUMENTS

| | | | | |
|---|---|---|---|---|
| 2005/0257041 | A1* | 11/2005 | Wallenstein | G06F 1/24 713/2 |
| 2007/0073800 | A1* | 3/2007 | Rothman | H04L 41/082 709/202 |
| 2007/0234073 | A1* | 10/2007 | Cromer | G06F 21/575 713/193 |
| 2007/0283003 | A1* | 12/2007 | Broyles | G06F 21/305 709/224 |
| 2008/0109909 | A1* | 5/2008 | Rhoades | G06F 21/6218 726/27 |
| 2008/0120423 | A1* | 5/2008 | Hall | H04L 12/12 709/229 |
| 2013/0019103 | A1* | 1/2013 | Read | H04L 9/3228 713/183 |
| 2013/0080765 | A1* | 3/2013 | Mohanty | H04L 63/0428 713/150 |
| 2013/0185789 | A1* | 7/2013 | Hagiwara | G06F 21/45 726/18 |
| 2015/0047022 | A1* | 2/2015 | von der Lippe et al. | 726/19 |
| 2016/0253502 | A1* | 9/2016 | Martins | G06F 21/575 726/19 |

* cited by examiner

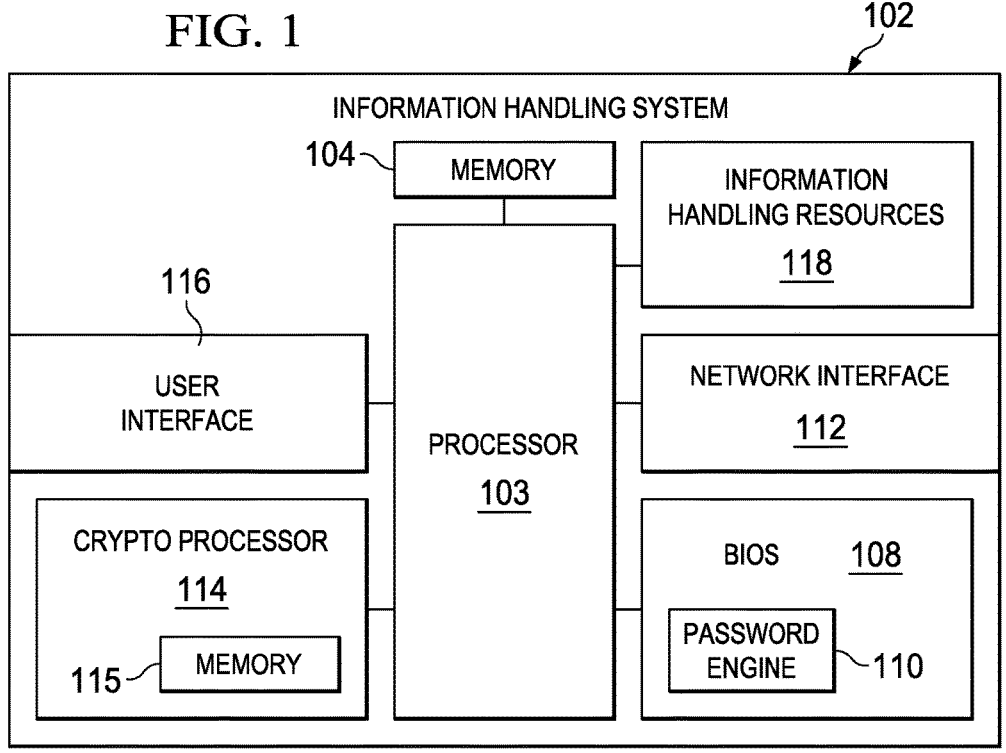
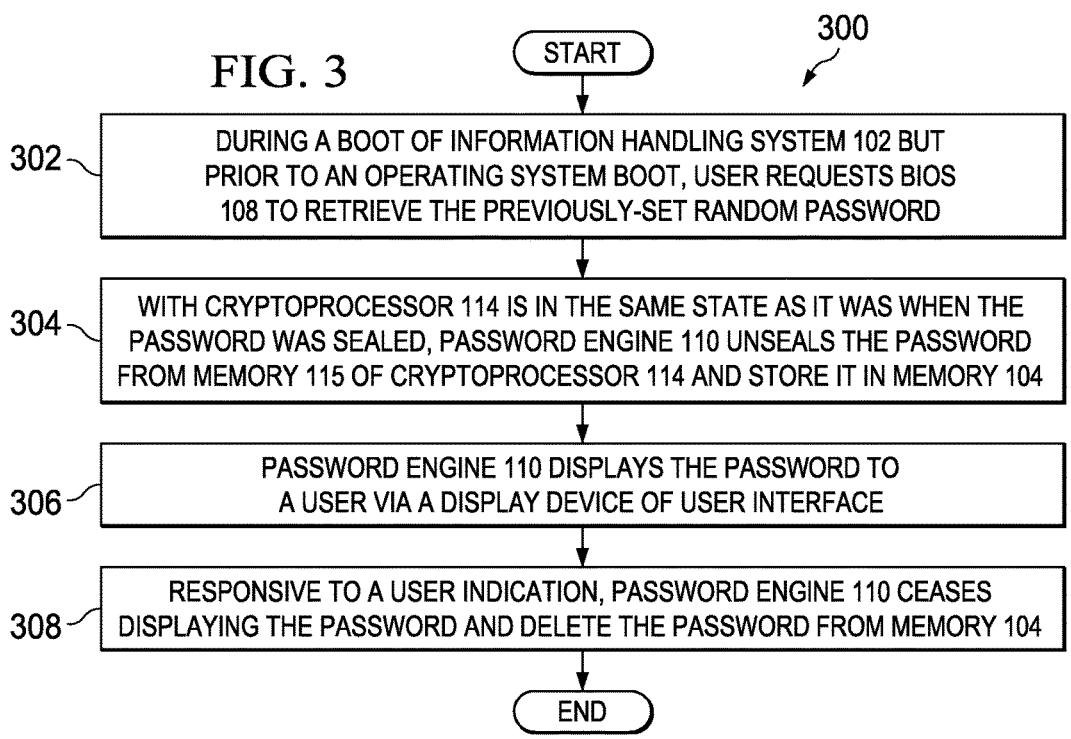

SYSTEMS AND METHODS FOR AUTOMATIC GENERATION AND RETRIEVAL OF AN INFORMATION HANDLING SYSTEM PASSWORD

TECHNICAL FIELD

The present disclosure relates in general to information handling systems, and more particularly to automatically generating a random password, such as an administrator password, for an information handling system and providing for retrieval of the password by an individual physically present at the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, by default, often ship without a password (e.g., an administrator password or other password) set in their respective firmware or basic input/output systems (BIOS). In some computing environments, including consumer systems, small businesses, "bring-your-own-device" operations, and in particular those environments in which an information technology presence (e.g., an information technology department) does not set a remote administrator password for managing an information handling system, a user of the information handling system may desire, if not expect, that the information handling system is protected from malware or other harmful intrusions.

However, if an administrator password is not set by an end user, malware may detect that the information handling system does not have an administrator password and may perform malicious operations. For example, without the administrator password set, malware may alter critical settings of the information handling system. As another example, malware may set the administrator password itself such that it controls all BIOS settings, thus locking the user out. As further examples, other malicious actions might include manipulating settings to set a boot device to a drive infected with malware, disabling security features, manipulating settings rendering the currently-installed operating system unable to boot, and/or enabling ports that may have been disabled for security reasons.

SUMMARY

In accordance with the teachings of the present disclosure, the disadvantages and problems associated with ensuring security of an information handling system during transit to an intended end user may be reduced or eliminated.

In accordance with embodiments of the present disclosure, an information handling system may include a processor and a basic input/output system (BIOS). The BIOS may comprise a program of instructions executable by the processor and configured to cause the processor to initialize one or more information handling resources of the information handling system. The BIOS may further be configured to, during a boot of an information handling system, and in response to a request to set a password associated with the information handling system, generate a random password, securely store the random password in a memory such that the password may be retrieved during a subsequent boot of the information handling system by a user physically present at the information handling system, and set the random password as the password associated with the information handling system.

In accordance with these and other embodiments of the present disclosure, a method may include, during a boot of an information handling system, and in response to a request to set a password associated with the information handling system, generating a random password, securely storing the random password in a memory such that the password may be retrieved during a subsequent boot of the information handling system by a user physically present at the information handling system, and setting the random password as the password associated with the information handling system.

In accordance with these and other embodiments of the present disclosure, an article of manufacture may include a non-transitory computer readable medium and computer-executable instructions carried on the computer readable medium. The instructions may be readable by a processor, the instructions, when read and executed, for causing the processor to, during a boot of an information handling system, and in response to a request to set a password associated with the information handling system, generate a random password, securely store the random password in a memory such that the password may be retrieved during a subsequent boot of the information handling system by a user physically present at the information handling system, and set the random password as the password associated with the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an example information handling system, in accordance with embodiments of the present disclosure;

FIG. 3 illustrates a flow chart of an example method for retrieval of a previously automatically-set password for an information handling system, in accordance with embodiments of the present disclosure.

DETAILED DESCRIPTION

Figure 2:
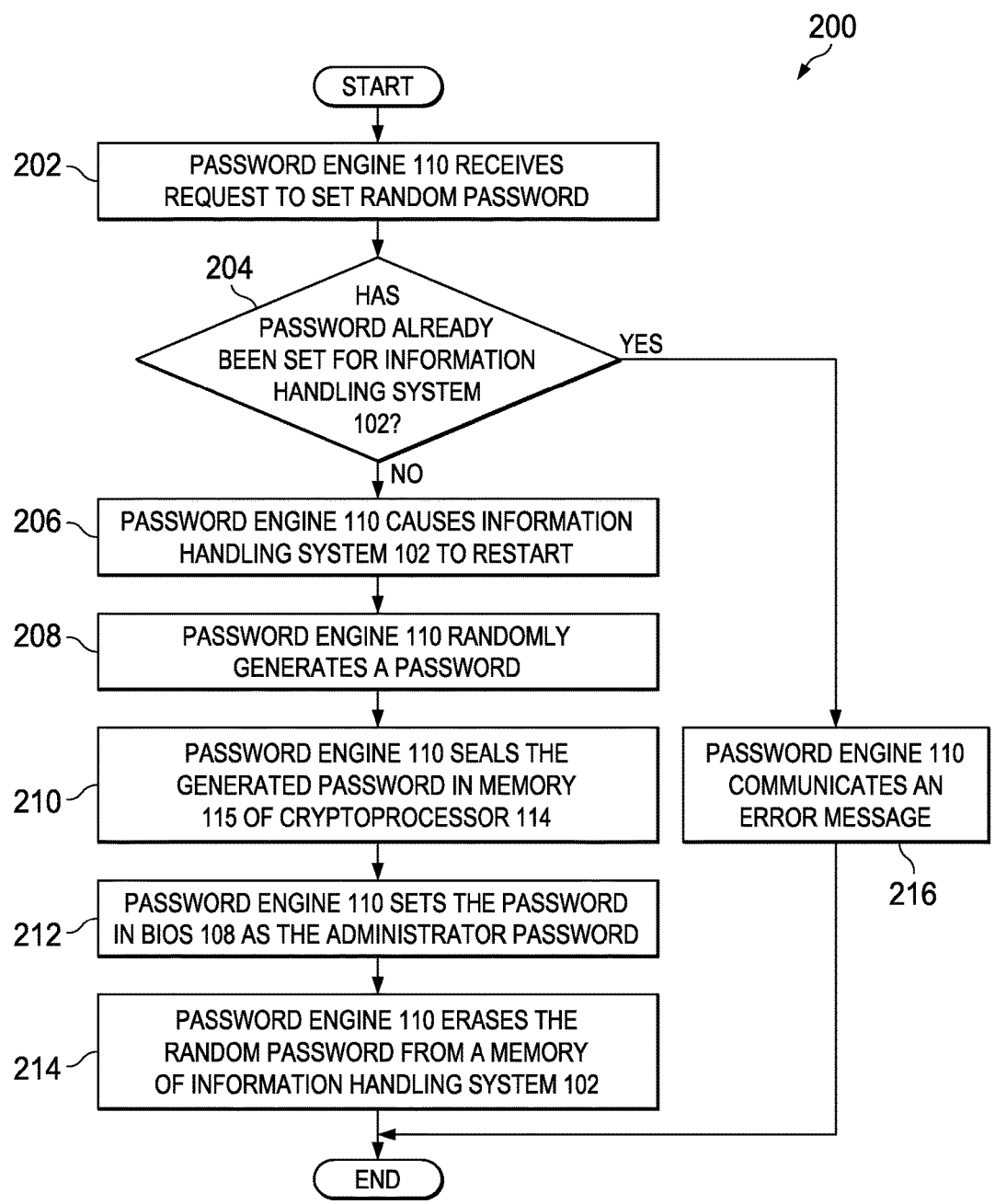
FIG. 2 illustrates a flow chart of an example method for automatically setting a password for an information handling system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, basic input/output system (BIOS) 108 communicatively coupled to processor 103, network interface 112 communicatively coupled to processor 103, a cryptoprocessor 114 communicatively coupled to processor 103, a user interface 116 communicatively coupled to processor 103, and one or more other information handling resources 118 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 108 may include a system password engine 110. As described in greater detail elsewhere in this disclosure, password engine 110 may include any system, device, or apparatus configured to, during execution of BIOS 108, manage and/or control the automatic setting of a password for information handling system 102 and/or the retrieval by a user of such automatically-set password. In some embodiments, password engine 110 may be implemented as a program of instructions that may be read by and executed on processor 103 to carry out the functionality of password engine 110.

Network interface 112 may include any suitable system, apparatus, or device operable to serve as an interface between information handling system 102 and a network coupled thereto. Network interface 112 may enable information handling system 102 to communicate over network 108 using any suitable transmission protocol and/or standard, including without limitation, Fibre Channel, Frame Relay, Asynchronous Transfer Mode (ATM), Internet protocol (IP), or other packet-based protocol. Network interface 112 may be configured to communicate to via wireless transmissions and/or wired communications.

Cryptoprocessor 114 may be communicatively coupled to processor 103 and/or BIOS 108 (e.g., via a suitable communication bus) and may include any system, device, or apparatus configured to carry out cryptographic operations on data communicated to it from processor 103, BIOS 108, and/or another component of information handling system 102. In some embodiments, cryptoprocessor 114 may be compliant with the Trusted Platform Module specification, a successor specification, and/or any other similar specification. In some embodiments, cryptoprocessor 114 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys and/or store keys (e.g., endorsement key, storage root key, attestation identity keys, storage keys).

As shown in FIG. 1, cryptoprocessor 114 may comprise a non-volatile memory 115 accessible only to cryptoprocessor 114. Memory 115 may comprise any system, device, or apparatus configured to retain program instructions or data for a period of time (e.g., computer-readable media). Memory 115 may comprise non-volatile random access memory (NVRAM), EEPROM, a PCMCIA card, flash memory, magnetic storage, opto-magnetic storage, or any suitable selection and/or array of non-volatile memory that retains data after power to information handling system 102 is turned off.

User interface 116 may comprise any instrumentality or aggregation of instrumentalities by which a user may interact with information handling system 102. For example, user interface 116 may permit a user to input data and/or instructions into information handling system 102, and/or otherwise manipulate information handling system 102 and its associated components. User interface 116 may also permit information handling system 102 to communicate data to a user, e.g., by way of a display device.

Generally speaking, information handling resources 118 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, password engine 110 may automatically, in response to a user request (e.g., a remote request by an administrator received via network interface 112), or during manufacturing of information handling system 102, automatically set a random password in order to block malicious attacks, such that the password is set at or before the first powering on of information handling system 102 by the end user, while at the same time avoiding the need for an individual or an information technology process to track the password. Thus, the password may be generated and set without requiring the administrator to be present at the information handling system when it is first turned on. In addition, password engine 110 may, in response to a user request received from a user physically present at information handling system 102, provide such password to the user via user interface 116.

FIG. 2 illustrates a flow chart of an example method 200 for automatically setting a password for an information handling system, in accordance with embodiments of the present disclosure. According to one embodiment, method 200 may begin at step 202. As noted above, teachings of the present disclosure may be implemented in a variety of configurations of information handling system 102.

At step 202, password engine 110 may receive a request to set a random password on the next restart of information handling system 102. In some embodiments, such request may be received remotely via network interface (e.g., via a Simple Network Management Protocol command or command of another suitable remote management protocol).

At step 204, password engine 110 may determine if a password (e.g., an administrator password) has already been set for information handling system 102. If the password has already been set, method 200 may proceed to step 216. Otherwise, if the password has not yet been set, method 200 may proceed to step 206.

At step 206, in response to determining that the password has not yet been set, password engine 110 may cause information handling system 102 to restart. At step 208, upon restart, password engine 110 may randomly generate a password using any suitable approach to create a random character string, as may be known in the art.

At step 210, password engine 110 may seal the generated password in memory 115 of cryptoprocessor 114. In some embodiments, password engine 110 may seal the generated password in memory 115 at a particular point of the boot process of BIOS 108 such that future retrieval of the password may only be performed by BIOS 108 during a pre-boot of BIOS 108, and not at any other time nor by any other executable software.

At step 212, password engine 110 may set the password in BIOS 108 as the administrator password, following the same procedures of storing an administrator password as if the administrator password had been set by a user physically present at information handling system 102 and interacting with information handling system 102 via user interface 116.

At step 214, password engine 110 may erase the random password from a memory (e.g., memory 104) of information handling system 102. In some embodiments, password engine 110 may cause information handling system 102 to reset and boot again in a "normal" fashion. After completion of step 214, method 200 may end. In other embodiments, if a restart is performed after step 214, the state of cryptoprocessor 114 may be modified such that further retrieval of the password from cryptoprocessor 114 is cryptographically impossible during later points in the boot process.

At step 216, in response to determining that the password has already been set, password engine 110 may communicate an error message (e.g., via network interface 112). After completion of step 216, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for retrieval of a previously automatically-set password for an information handling system, in accordance with embodiments of the present disclosure. The retrieval process described with respect to method 300 may be attempted by any individual physically present at information handling system 102 and aware that the steps of method 200 have been executed on information handling system 102 to set a random character string password.

According to one embodiment, method 300 may begin at step 302. As noted above, teachings of the present disclosure may be implemented in a variety of configurations of information handling system 102.

At step 302, during a boot of information handling system 102 but prior to an operating system boot, a user may request to BIOS 108 to retrieve the previously-set random password. Such request may be made by the user and received by BIOS 108 in any suitable manner that ensures that the user making the request is physically present at information handling system 102, and not making such request remotely. For instance, in some embodiments, such a request may be triggered by pressing a particular key of a keyboard of user interface 116 and/or another button of information handling system 102 during the boot of information handling system 102. In these and other embodiments, such a request may be triggered by a user selection of a menu option in a pre-boot menu of information handling system 102 or in a setup program for BIOS 108. In these and other embodiments, such a request may be triggered by a user response to a prompt during pre-boot configured to only receive the response from a user physically present at information handling system 102.

At step 304, while cryptoprocessor 114 is in the same state as it was when the password was sealed (at step 210 of method 200), password engine 110 may unseal the password from memory 115 of cryptoprocessor 114 and store it in memory 104.

At step 306, password engine 110 may display the password to a user via a display device of user interface 116 (e.g., by way of BIOS display/drawing libraries).

At step 308, responsive to a user indication (e.g., a key press of a keyboard of user interface 116), password engine 110 may cease displaying the password and delete the password from memory 104. In some embodiments, password engine 110 may then cause information handling system 102 to reset and to boot again in a "normal" fashion. After completion of step 308, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
a network interface communicatively coupled to the processor and to a network; and
a basic input/output system (BIOS) comprising processor executable BIOS instructions that, when executed, cause the processor to perform BIOS operations including:
  initializing one or more information handling resources of the information handling system;
  responsive to receiving, from a remote administrator via the network interface, a remote management request for an administrator password for the information handling system, determining whether the administrator password has been set previously;
  responsive to determining that the administrator password has been set previously, generating an error message;
  responsive to determining that the administrator password has not been previously set, performing password setting operations, comprising:
    causing the information handling system to restart;
    generating a random character string;
    sealing the random character string in cryptoprocessor memory and preserving a cryptoprocessor state as of the sealing, wherein the cryptoprocessor memory is accessible only to a cryptoprocessor of the information handling system wherein the cryptoprocessor state indicates a state of the cryptoprocessor; and
    setting the random character string as the administrator password in firmware; and
  after the random character string has been set as the administrator password, responding to receiving, during a portion of booting the information handling system prior to booting an operating system, a user request for the administrator password, by performing password revealing operations, comprising:

responsive to determining that an aspect of the user request ensures that a user making the user request is physically present at the information handling system and that a current cryptoprocessor state matches the cryptoprocessor state as of the sealing, unsealing the administrator password from cryptoprocessor memory, storing the administrator password in system memory, and displaying the administrator password via a user interface display.

2. The information handling system of claim 1, wherein the aspect of the user request includes at least one of:

the user request is initiated by asserting a particular key of a keyboard associated with the information handling system; and the user request is initiated by selecting a particular BIOS menu option.

3. The information handling system of claim 1, wherein the cryptoprocessor memory comprises non-volatile memory.

4. The information handling system of claim 1, wherein the password revealing operations include:

responsive to an indication from the user, ceasing said displaying of the administrator password.

5. The information handling system of claim 4, wherein the password revealing operations include:

after ceasing said displaying, causing the information handling system to reset and boot.

6. A method comprising:

responsive to receiving, from a remote administrator via a network interface of an information handling system, a remote management request for an administrator password for the information handling system, determining whether the administrator password has been set previously;

responsive to determining that the administrator password has been set previously, generating an error message;

responsive to determining that the administrator password has not been previously set, performing password setting operations, comprising:

causing the information handling system to restart;
generating a random character string;
sealing the random character string in cryptoprocessor memory and preserving a cryptoprocessor state as of the sealing, wherein the cryptoprocessor memory is accessible only to a cryptoprocessor of the information handling system wherein the cryptoprocessor state indicates a state of the cryptoprocessor; and setting the random character string as the administrator password in firmware; and after the random character string has been set as the administrator password, responding to receiving, during a portion of booting the information handling system prior to booting an operating system, a user request for the administrator password, by performing password revealing operations, comprising:

responsive to determining that an aspect of the user request ensures that a user making the user request is physically present at the information handling system and that a current cryptoprocessor state matches the cryptoprocessor state as of the sealing, unsealing the administrator password from cryptoprocessor memory, storing the administrator password in system memory, and displaying the administrator password via a user interface display.

7. The method of claim 6, further comprising:

ceasing the displaying of the administrator password; and erasing the administrator password from a memory of the information handling system.

8. The method of claim 7, wherein the cryptoprocessor memory comprises non-volatile memory.

9. The method of claim 6, wherein the remote management request comprises a simple network management protocol (SNMP) compliant command.

10. The method of claim 6, wherein determining whether the user is physically present includes at least one of:

detecting assertion of a particular key of a keyboard of the information handling system; and detecting a user response to a BIOS prompt.

11. The method of claim 6, wherein the cryptoprocessor is configured to generate encryption keys, generate and maintain hash key tables of hardware and software components of the information handling system, generate and maintain configuration parameters associated with hardware and software components of the information handling system.

12. An article of manufacture comprising:

a non-transitory computer readable medium including processor-executable basic input/output system (BIOS) instructions that, when executed by a processor of an information handling system, cause the processor to perform operations comprising:

responsive to receiving, from a remote administrator via a network interface of the information handling system, a remote management request for an administrator password for the information handling system, determining whether the administrator password has been set previously;

responsive to determining that the administrator password has been set previously, generating an error message;

responsive to determining that the administrator password has not been previously set, performing password setting operations, comprising:

causing the information handling system to restart;
generating a random character string;
sealing the random character string in cryptoprocessor memory and preserving a cryptoprocessor state as of the sealing, wherein the cryptoprocessor memory is accessible only to a cryptoprocessor of the information handling system wherein the cryptoprocessor state indicates a state of the cryptoprocessor; and setting the random character string as the administrator password in firmware; and after the random character string has been set as the administrator password, responding to receiving, during a portion of booting the information handling system prior to booting an operating system, a user request for the administrator password, by performing password revealing operations, comprising:

responsive to determining that an aspect of the user request ensures that a user making the user request is physically present at the information handling system and that a current cryptoprocessor state matches the cryptoprocessor state as of the sealing, unsealing the administrator password from cryptoprocessor memory, storing the administrator password in system memory, and displaying the administrator password via a user interface display.

13. The article of manufacture of claim 12, wherein the operations include:
   ceasing the displaying of the administrator password; and
   erasing the administrator password from a memory of the information handling system.

14. The article of manufacture of claim 13, wherein the remote management request comprises a simple network management protocol (SNMP) compliant command.

15. The article of manufacture of claim 12, wherein ensuring the user is physically present includes at least one of:
   detecting assertion of a particular key of a keyboard connected to the information handling system; and
   detecting selection of a particular BIOS menu option.

16. The article of manufacture of claim 15, wherein the cryptoprocessor is configured to generate encryption keys, generate and maintain hash key tables of hardware and software components of the information handling system, and generate and maintain configuration parameters associated with hardware and software components of the information handling system.

17. The article of manufacture of claim 16, wherein the operations include:
   after ceasing said displaying, re-booting the information handling system.

* * * * *